United States Patent
George et al.

(10) Patent No.: US 11,138,088 B2
(45) Date of Patent: Oct. 5, 2021

(54) AUTOMATED IDENTIFICATION OF EVENTS ASSOCIATED WITH A PERFORMANCE DEGRADATION IN A COMPUTER SYSTEM

(71) Applicant: Hewlett Packard Enterprise Development LP, Houston, TX (US)

(72) Inventors: Aneesh George, Bangalore (IN); Rashmi M. G., Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 16/263,089

(22) Filed: Jan. 31, 2019

(65) Prior Publication Data
US 2020/0250063 A1    Aug. 6, 2020

(51) Int. Cl.
*G06F 11/34* (2006.01)
*G06F 16/22* (2019.01)
*G06F 17/18* (2006.01)
*G06F 17/16* (2006.01)

(52) U.S. Cl.
CPC ...... *G06F 11/3419* (2013.01); *G06F 11/3428* (2013.01); *G06F 11/3452* (2013.01); *G06F 16/2237* (2019.01); *G06F 17/16* (2013.01); *G06F 17/18* (2013.01)

(58) Field of Classification Search
CPC ............. G06F 11/3419; G06F 11/3428; G06F 11/3452; G06F 16/2237; G06F 17/16
See application file for complete search history.

(56) References Cited

U.S. PATENT DOCUMENTS

| 10,078,569 B1 * | 9/2018 | Alshawabkeh ..... G06F 11/3414 |
| 10,217,060 B2 * | 2/2019 | Yousefi'zadeh ...... H04W 24/02 |
| 2014/0019403 A1 | 1/2014 | Harrison et al. |
| 2017/0315897 A1 | 11/2017 | Brooks et al. |

(Continued)

FOREIGN PATENT DOCUMENTS

CN    107203467    9/2017

OTHER PUBLICATIONS

Tuncer et al., "Diagnosing Performance Variations in HPC Applications Using Machine Learning", 2017, 18 pages.

(Continued)

*Primary Examiner* — Elias Desta
(74) *Attorney, Agent, or Firm* — Hewlett Packard Einterprise Patent Department

(57) ABSTRACT

A computing device includes a processor and a medium storing instructions executable to: detect a performance degradation of a first component of a computing system; in response to a detection of the performance degradation of the first component, filter a plurality of system events of the computing system using an impact matrix to generate a filtered set of system events, wherein each system event of the filtered set is associated with a first set of components of the computing system, wherein the impact matrix indicates one or more components of the first set that can have a performance impact on the first component; perform a linear regression on the filtered set of system events; and generate a ranked list of system events based on the linear regression, the system events in the ranked list being ordered according to likelihood of having caused the performance degradation.

20 Claims, 6 Drawing Sheets

(56) References Cited

U.S. PATENT DOCUMENTS

2017/0329660 A1    11/2017  Salunke et al.
2018/0248905 A1     8/2018  Cote et al.
2018/0321980 A1*   11/2018  Lo ........................ G06F 9/4887

OTHER PUBLICATIONS

Tuncer et al., "Online Diagnosis of Performance Variation in HPC Systems Using Machine Learning", Sep. 2018, 14 pages, Institute of Electrical and Electronics Engineers.

* cited by examiner

| 310 { | | | | | 136 | | | | | } 320 |
|---|---|---|---|---|---|---|---|---|---|---|
|  | A | B | C | D | ... | ... | ... | ... | ... | N |
| A | 0 | 1 | 0 | 1 | ... | ... | ... | ... | ... | 0 |
| B | 0 | 0 | 1 | 0 | ... | ... | ... | ... | ... | 0 |
| C | 1 | 1 | 0 | 1 | ... | ... | ... | ... | ... | 1 |
| D | 1 | 1 | 1 | 0 | ... | ... | ... | ... | ... | 1 |
| ... | ... | ... | ... | ... | ... | ... | ... | ... | ... | ... |
| ... | ... | ... | ... | ... | ... | ... | ... | ... | ... | ... |
| N | 0 | 0 | 1 | 0 | ... | ... | ... | ... | ... | 0 |

FIG. 3A

| 310 { | | | | | 136 | | | | | } 320 |
|---|---|---|---|---|---|---|---|---|---|---|
|  | A | B | C | D | ... | ... | ... | ... | ... | N |
| A | 0 | 0.3 | 0 | 0.1 | ... | ... | ... | ... | ... | 0 |
| B | 0 | 0 | 0.1 | 0 | ... | ... | ... | ... | ... | 0.2 |
| C | 0.3 | 0.1 | 0 | 0.1 | ... | ... | ... | ... | ... | 0.1 |
| D | 0.1 | 0.1 | 0.1 | 0 | ... | ... | ... | ... | ... | 0.4 |
| ... | ... | ... | ... | ... | ... | ... | ... | ... | ... | ... |
| ... | ... | ... | ... | ... | ... | ... | ... | ... | ... | ... |
| N | 0 | 0 | 0.5 | 0 | ... | ... | ... | ... | ... | 0 |

FIG. 3B

AUTOMATED IDENTIFICATION OF EVENTS ASSOCIATED WITH A PERFORMANCE DEGRADATION IN A COMPUTER SYSTEM

BACKGROUND

A computing system can include any number of computing devices and components. For example, a server rack system may include multiple computing modules (e.g., blade servers), networking devices, storage devices, power supply components, and so forth. The server rack system may be included in a larger system providing computing services (e.g., a datacenter, a cluster, and so forth).

BRIEF DESCRIPTION OF THE DRAWINGS

Some implementations are described with respect to the following figures.

FIGS. 3A-3B are illustrations of example data structures, in accordance with some implementations.

DETAILED DESCRIPTION

In some computing systems, performance metrics may be generated and analyzed to ensure that system requirements are being satisfied. For example, an information technology (IT) services provider may track the performance of various devices and components in a datacenter. If an anomaly is detected in a performance metric, the IT service provider may wish to determine the root cause of the anomaly, and then take some remedial action to address the root cause. However, some computing systems have become increasingly complex, with larger numbers and types of components that interact and/or are interconnected in various ways. Accordingly, in such complex systems, it may be difficult to determine the root cause of the performance anomaly. For example, because a computing system can be reconfigured and updated with new components and/or technologies, it may be difficult to write and implement hard-coded algorithms that can automatically determine root causes of performance anomalies. Accordingly, resolving such performance anomalies by human experts may require a large amount of time, effort, and/or expense.

As described further below with reference to FIGS. 1-6, some implementations may provide automated identification of events associated with a performance degradation in a computer system. In some examples, a management device may detect a performance degradation of a first component of a computing system. In response, the management device may filter system events using a stored topology, and may thereby generate a filtered set of events that could have a performance impact on the first component. The management device may perform a linear regression to identify a subset of events that match the performance degradation, and may generate a ranked list of the subset of events. Further, the management device may use the subset of events to perform automated remedial actions. In this manner, the root cause of the performance degradation may be automatically identified and resolved. Accordingly, some implementations may provide improved automated recovery from performance degradation in a computer system.

Figure 1:
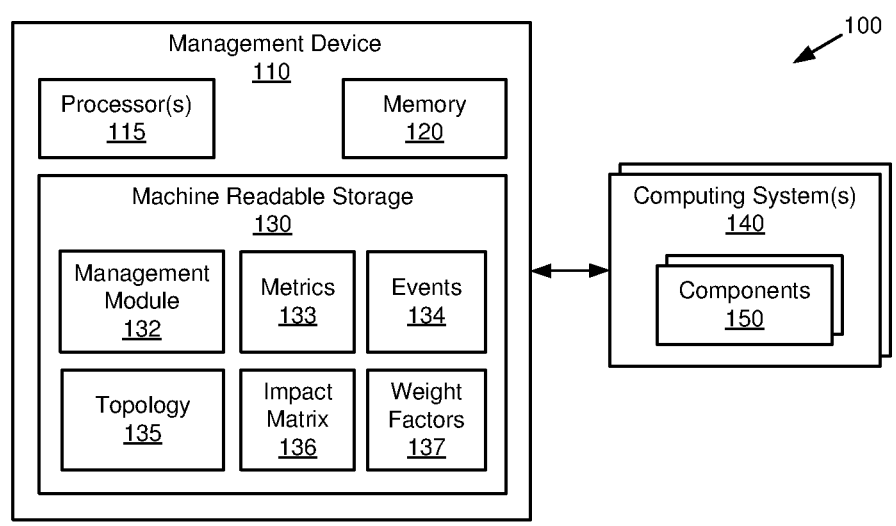
FIG. 1 is a schematic diagram of an example system, in accordance with some implementations.

FIG. 1 shows a schematic diagram of an example system 100, in accordance with some implementations. As shown, in some implementations, the system 100 may include a management device 110 to monitor and/or control computing system(s) 140 including any number of components 150. For example, a computing system 140 may be a server rack system including multiple computing modules (e.g., blade servers), networking devices, storage devices, power supply components, and so forth. Further, in other examples, a computing system 140 may be a computing cluster, a datacenter, a server, a desktop computer, an appliance, and so forth. In some implementations, the components 150 may be Field Replaceable Units (FRUs) of the computing system 140. In some examples, the In some implementations, the management device 110 may be a computing device including processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include a management module 132, system metrics 133, system events 134, system topology 135, impact matrix 136, and weight factors 137. In some examples, the management module 132 may be implemented in executable instructions stored in the machine-readable storage 130 (e.g., software and/or firmware). However, the management module 132 can be implemented in any suitable manner. For example, some or all of the management module 132 could be hard-coded as circuitry included in the processor(s) 115 and/or the management device 110. In other examples, some or all of the management module 132 could be implemented on a remote computer (not shown), as web services, and so forth. In another example, the management module 132 may be implemented in one or more controllers of the management device 110.

In one or more implementations, the system metrics 133 may include data indicating performance metrics and characteristics of a computing system 140. For example, the system metrics 133 may include processor utilization, instructions executed per time unit, memory utilization, disk utilization, network utilization, network transfer rate, and so forth. In some examples, the system events 134 may be generated by one or more components (e.g., firmware, operating system, circuitry, etc.), may be converted into a single data format, and/or may be collected in a single repository.

In some implementations, the system events 134 may include data indicating events, state changes, and/or errors that are associated with components 150 in a computing system 140. For example, the system events 134 may include data indicating a failure of power supply component, a speed reduction in a cooling fan, a reduction of clock frequency in a processor, an error in a cache, a speed increase in a cooling fan, an increase of clock frequency in a processor, and so forth. In some examples, the system events 134 may be generated by one or more components (e.g., firmware, operating system, circuitry, etc.), may be converted into a single data format, and/or may be collected in a single repository. In some implementations, each system event 134 includes a field indicating an associated component 150 (e.g., a component affected by an error).

In one or more implementations, the system topology 135 may include data representing the components 150 included in a computing system 140. For example, the system topology 135 may include data indicating numbers and types of components 150, interconnections between components 150, software configurations of components 150, hardware configurations of components 150, operating systems, software applications, drivers, and so forth. In some implementations, the impact matrix 136 may include data indicating which components 150 can have a performance impact on other components 150. In one or more implementations, the weight factors 137 may include data indicating a proportion or percentage of performance impact that the system events 134 can have on components 150. In some examples, the impact weight factors may be specified by the manufacturer of the components 150. The impact matrix 136 and the weight factors 137 are described further below with reference to FIGS. 2-3B, which show examples according to some implementations. In some implementations, the system metrics 133, the system events 134, the system topology 135, the impact matrix 136, and/or the weight factors 137 may store data in one or more organized structures (e.g., relational tables, extensible markup language (XML) files, flat files, and so forth).

In one or more implementations, the management module 132 may detect a performance degradation of a component 150, and in response may filter the system events 134 using the impact matrix 136. The management module 132 may perform a linear regression on the filtered system events, and may thereby determine which system events 134 are most likely to have caused (or are otherwise associated with) the detected performance degradation. In some implementations, the management module 132 may generate a ranked list of system events that is ordered according to probable impact and/or relevance to the detected performance degradation. The ranked list may be used to perform automated remedial actions, and/or may be presented to a human analyst. In this manner, the root cause(s) of performance degradation may be automatically identified. The functions of the management module 132 are discussed further below with reference to FIGS. 2-6.

Figure 2:
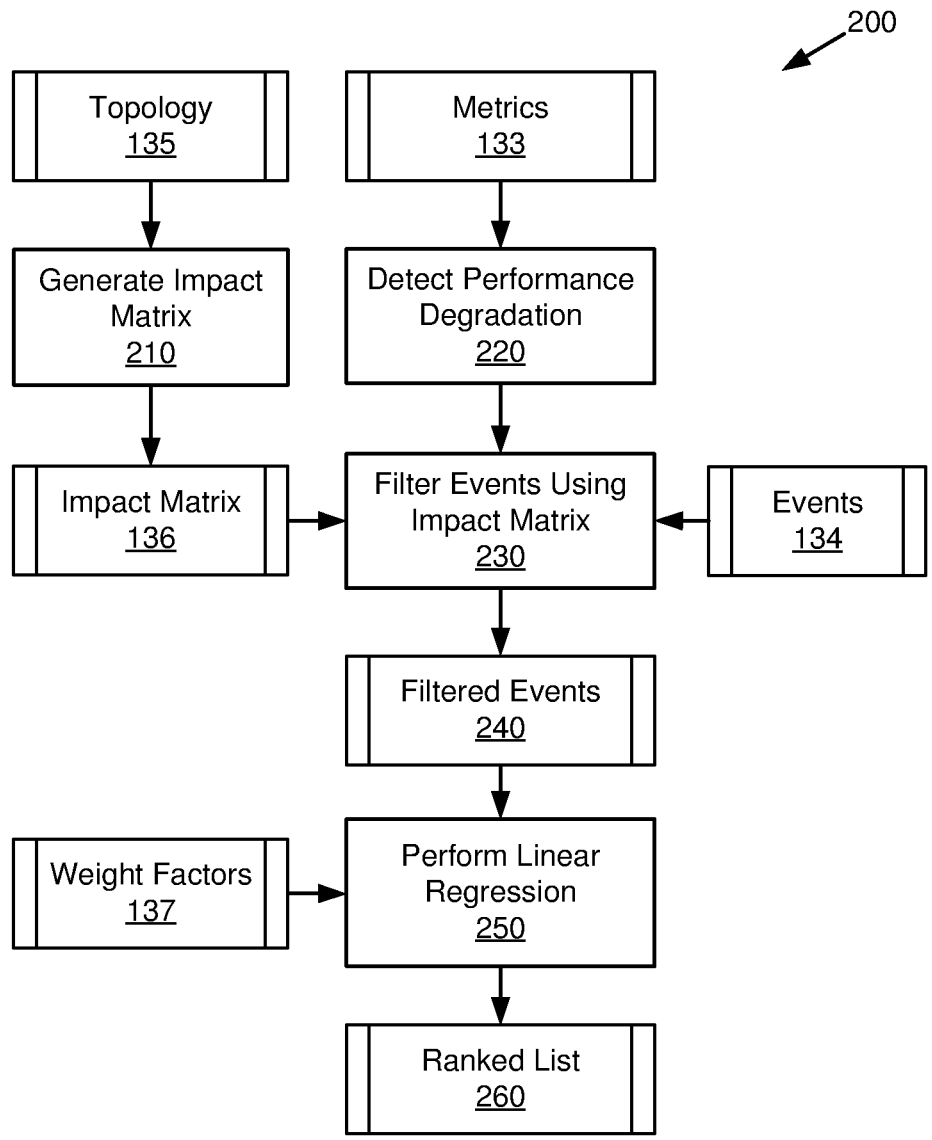
FIG. 2 is an illustration of an example operation, in accordance with some implementations.

Referring now to FIG. 2, shown is an illustration of an example operation 200 in accordance with some implementations. In some examples, some or all of the operation 200 may be performed by the management device 110 (shown in FIG. 1). As shown in FIG. 2, block 210 includes generating an impact matrix 136 using a system topology 136. In some implementations, generating the impact matrix 136 may include applying predefined rules to system devices and configurations in the system topology 136 to determine which components can have a performance impact on another component. For example, if the system topology 136 indicates that a cooling fan is coupled or mounted to a processor, a rule may indicate that the speed or state of the cooling fan can cause the processor to heat up, and therefore can reduce the execution performance of the processor. In another example, if the system topology 136 indicates that a storage device stores data used by multiple blade servers, a rule may indicate that an error in the storage device can affect the performance of each of the blade servers.

In one or more implementations, the impact matrix 136 may be a data structure including binary values (i.e., 0/1) to indicate which components can have a performance impact on other components. Further, in some implementations, the impact matrix 136 may be a data structure including proportional values to indicate the proportional performance impacts that components can have on other components. Example implementations of the impact matrix 136 are discussed below with reference to FIGS. 3A-3B.

Referring now to FIG. 3A, shown is an impact matrix 136 with binary values, in accordance with some implementations. Assume that impact matrix 136 corresponds to a computing system including N components. Accordingly, as shown in FIG. 3A, the impact matrix 136 may be organized as an N-by-N matrix, with rows 310 labeled A to N, and columns 320 labeled A to N. In some examples, each matrix cell may include a "0" if the component represented by the row cannot have a performance impact on the component represented by the column component, and may include a "1" if the component represented by the row can have a performance impact on the component represented by the column component. For example, the row "B" includes a "1" in the column "C," thus indicating that component B can have a performance impact on component C. Note that, in other examples, the rows 310 may represent the components that can be impacted by the components represented by the columns 320.

Referring now to FIG. 3B, shown is an impact matrix 136 with proportional values, in accordance with some implementations. Assume that, in the example shown in FIG. 3B, each matrix cell may include may include a numeric value or fraction representing the percentage of performance impact that the row component can have on the column component. For example, the row "A" includes a "0.3" in the column "B," thus indicating that component A can have 30% of the performance impact on component B.

Referring again to FIG. 2, block 220 includes detecting a performance degradation based on one or more system metrics 133. In some implementations, detecting the performance degradation may include calculating the average of a performance metric of each component over a sample time window (e.g., calculating the utilization of processor A over the most recent period T). Further, detecting the performance degradation may include calculating a variance for each average performance metric over the time window, and determining an absolute variance difference between the calculated variance and a historical variance (e.g., a variance calculated for past metrics over multiple sample time windows). For example, the absolute variance difference may be calculated using the following formula: absolute(square (historical_variance)−square(calculated_variance)).

In one or more implementations, if the absolute variance difference is greater than a threshold variance, a performance degradation may be detected at block 220. In some implementations, the performance degradation may be associated with a particular system component (referred to herein as the "target component"). For example, assume that the performance degradation is detected in a metric associated with component A (e.g., average utilization of component A). In this example, the performance degradation may be referred to as corresponding to target component A.

In response to detecting the performance degradation, block 230 may include filtering the system events 134 using the impact matrix 136, thereby generating a set of filtered events 240. In some implementations, the impact matrix 136 may be used to remove system events 134 for components that cannot have a performance impact on the target component. For example, assume that the performance degradation (detected at block 220) corresponds to target component A. Assume further that the impact matrix 136 indicates that only components C and D can have a performance impact on target component A (e.g., as in the example shown in FIG. 3A). Accordingly, after filtering the system events 134 using the impact matrix 136, the set of filtered events 240 may only include system events 134 associated with components A, C, and D.

As shown in FIG. 2, block 250 may include performing a linear regression of the set of filtered events 240 using the weight factors 137. In some implementations, a multi-linear regression model may use weight factors 137 that each represent the percentage of performance impact that a particular event can have on the target component. For example, block 250 may include determining total impact values for various subsets or combinations of filtered events 240 (e.g., by summing the weight factors 137 associated with a particular subset of filtered events 240). Further, block 250 may include comparing these total impact values to the absolute variance difference (e.g., determined at block 220), and selecting a subset of filtered events 240 that matches the absolute variance difference within a given tolerance. The events of this subset may be ranked according to their individual performance impacts, and may be included in a ranked list 260. In some examples, the ranked list 260 may be used to perform automated remedial actions (e.g., initiate a firmware update, perform a socket reconfiguration, and so forth). Further, the ranked list 260 may be presented to a human analyst to provide information regarding possible root causes of the performance degradation.

Figure 4:
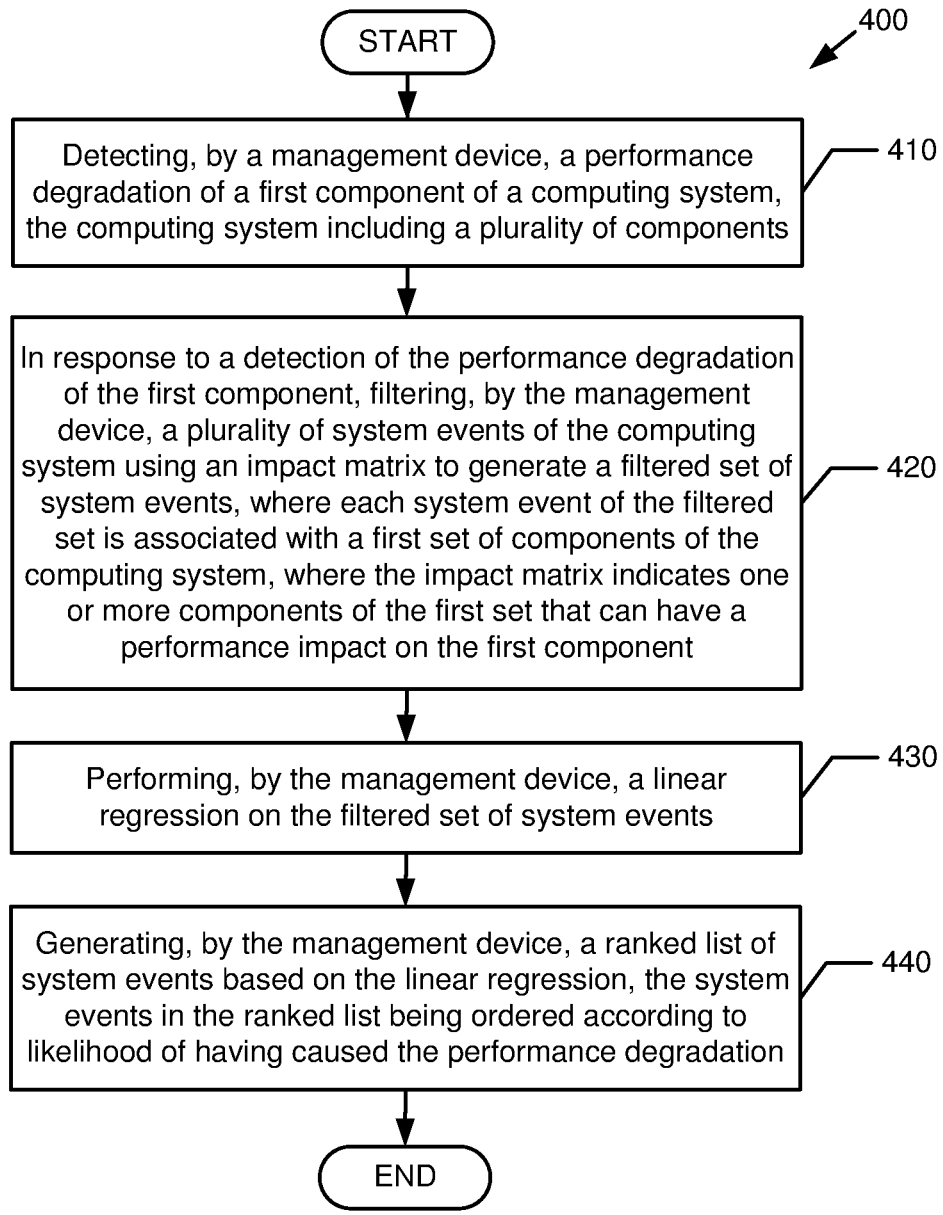
FIG. 4 is an illustration of an example process, in accordance with some implementations.

Referring now to FIG. 4, shown is an example process 400, in accordance with some implementations. In some examples, the process 400 may be performed by some or all of the management device 110 (shown in FIG. 1). The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-3B, which show examples in accordance with some implementations. However, other implementations are also possible.

Block 410 may include detecting, by a management device, a performance degradation of a first component of a computing system, the computing system including a plurality of components. For example, referring to FIGS. 1-2, the management device 110 may calculate average values of a performance metric of component A over a sample time window. The management device 110 may calculate the variance of the average performance metric over the time window, calculate an absolute variance difference between the calculated variance and a historical variance, and detect a performance degradation responsive to a determination that the absolute variance difference exceeds a threshold variance.

Block 420 may include, in response to a detection of the performance degradation of the first component, filtering, by the management device, a plurality of system events of the computing system using an impact matrix to generate a filtered set of system events, where each system event of the filtered set is associated with a first set of components of the computing system, where the impact matrix indicates one or more components of the first set that can have a performance impact on the first component. For example, referring to FIGS. 1-2, the management device 110 may determine that the performance degradation (detected at block 410) corresponds to target component A, and may determine that the impact matrix 136 indicates that only components C and D can have a performance impact on target component A. Accordingly, the management device 110 may filter out any system events 134 that are not associated with components A, C, and D, thereby removing system events 134 for components that cannot have a performance impact on component A.

Block 430 may include performing, by the management device, a linear regression on the filtered set of system events. For example, referring to FIGS. 1-2, the management device 110 may perform a multi-linear regression model of the set of filtered events 240 using the weight factors 137.

Block 440 may include generating, by the management device, a ranked list of system events based on the linear regression, the system events in the ranked list being ordered according to likelihood of having caused the performance degradation. For example, referring to FIGS. 1-2, the management device 110 may use a multi-linear regression model to evaluate total impact values for various subsets or combinations of filtered events 240, and may select a subset of filtered events 240 that matches the absolute variance difference (determined at block 410) within a given tolerance. The ranked list 260 may list the events of the selected subset according to their individual performance impacts. In some implementations, the ranked list 260 may be used to perform automated remedial actions and/or may be presented to a human analyst. After block 440, the process 400 may be completed.

Figure 5:
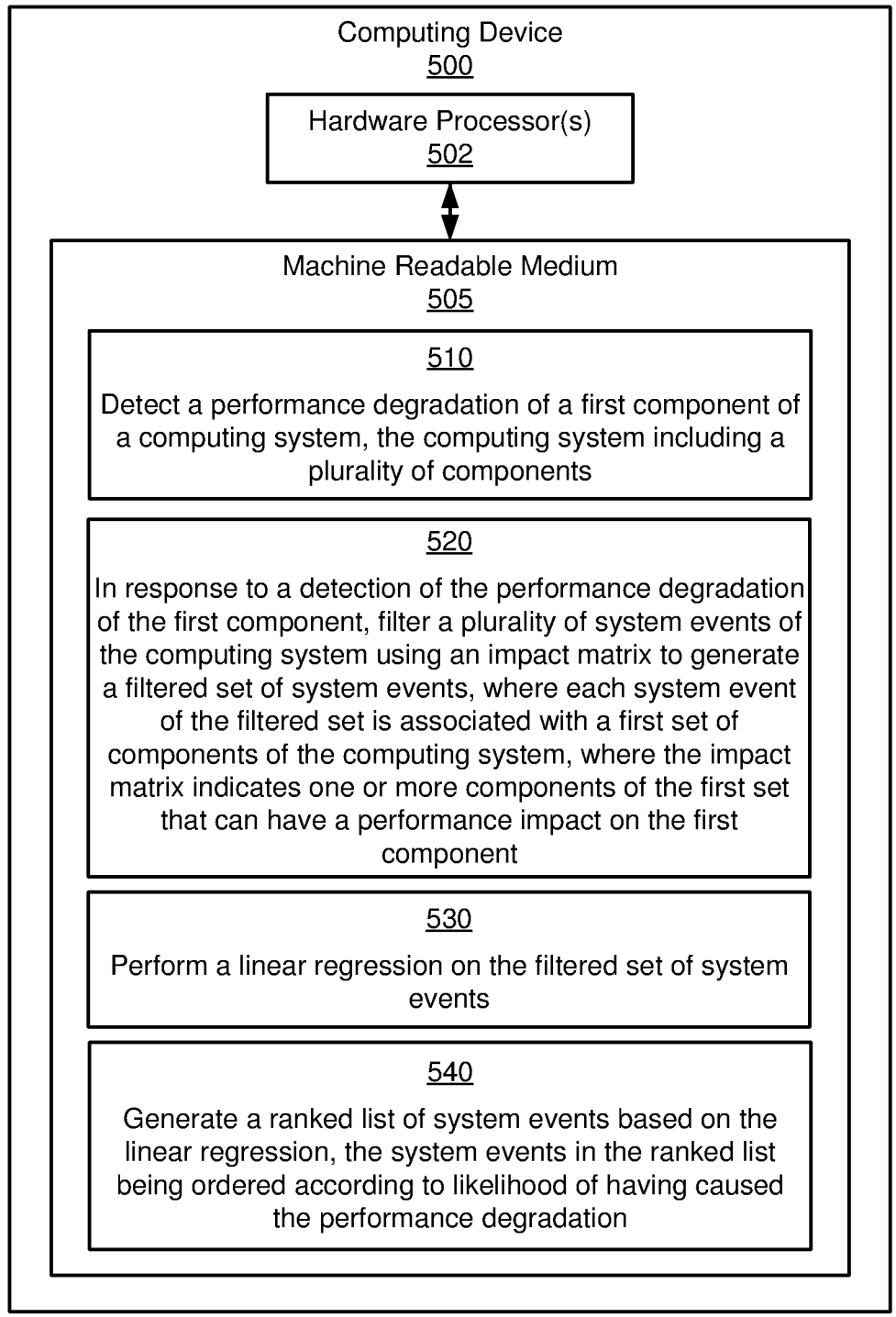
FIG. 5 is a schematic diagram of an example computing device, in accordance with some implementations

Referring now to FIG. 5, shown is a schematic diagram of an example computing device 500. In some examples, the computing device 500 may correspond generally to the management device 110 (shown in FIG. 1) and/or the management device 210 (shown in FIG. 2). As shown, the computing device 500 may include hardware processor(s) 502 and machine-readable storage medium 505 including instruction 510-530. The machine-readable storage medium 505 may be a non-transitory medium. The instructions 510-530 may be executed by the hardware processor(s) 502.

Instruction 510 may be executed to detect a performance degradation of a first component of a computing system, the computing system including a plurality of components. Instruction 520 may be executed to, in response to a detection of the performance degradation of the first component, filter a plurality of system events of the computing system using an impact matrix to generate a filtered set of system events, where each system event of the filtered set is associated with a first set of components of the computing system, where the impact matrix indicates one or more components of the first set that can have a performance impact on the first component.

Instruction 530 may be executed to perform a linear regression on the filtered set of system events. Instruction 540 may be executed to generate a ranked list of system events based on the linear regression, the system events in the ranked list being ordered according to likelihood of having caused the performance degradation.

Figure 6:
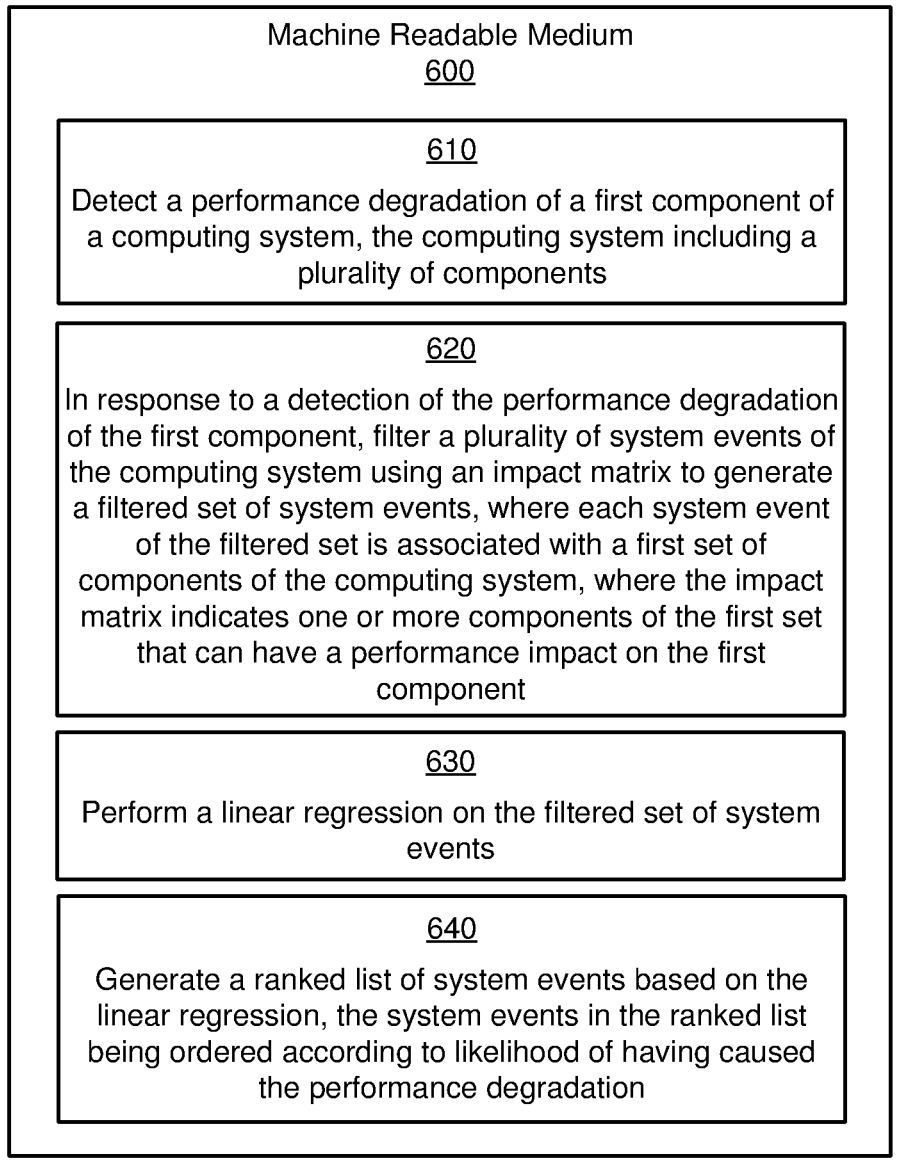
FIG. 6 is a diagram of an example machine-readable medium storing instructions in accordance with some implementations.

Referring now to FIG. 6, shown is machine-readable medium 600 storing instructions 610-630, in accordance with some implementations. The instructions 610-630 can be executed by any number of processors (e.g., the processor(s) 115 shown in FIG. 2). The machine-readable medium 600 may be a non-transitory storage medium, such as an optical, semiconductor, or magnetic storage medium.

Instruction 610 may be executed to detect a performance degradation of a first component of a computing system, the computing system including a plurality of components. Instruction 620 may be executed to, in response to a detection of the performance degradation of the first component, filter a plurality of system events of the computing system using an impact matrix to generate a filtered set of system events, where each system event of the filtered set is associated with a first set of components of the computing system, where the impact matrix indicates one or more components of the first set that can have a performance impact on the first component.

Instruction 630 may be executed to perform a linear regression on the filtered set of system events. Instruction 640 may be executed to generate a ranked list of system events based on the linear regression, the system events in the ranked list being ordered according to likelihood of having caused the performance degradation.

Note that, while FIGS. 1-6 show various examples, implementations are not limited in this regard. For example, referring to FIG. 1, it is contemplated that system 100 may include additional devices, fewer devices, different devices, different components, different connection paths, different protocols, and so forth. In another example, it is contemplated that the primary path and/or the alternative path may include any number or type of switches, ports, connections, and so forth. In still another example, it is contemplated that the system metrics 133, system events 134, system topology 135, impact matrix 136, and/or weight factors 137 may be stored externally to the management device 110. Other combinations and/or variations are also possible.

In accordance with some implementations, examples are provided for automated identification of events associated with a performance degradation in a computer system. In some examples, a management device may detect a performance degradation, and may filter system events using a stored topology. The management device may perform a linear regression to identify a subset of filtered events that match the performance degradation, and may generate a ranked list of the subset of events. Further, the management device may use the subset of events to perform automated remedial actions. In this manner, the root cause of the performance degradation may be automatically identified and resolved. Accordingly, some implementations may provide improved automated recovery from performance degradation in a computer system.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a hardware processor; and
a machine-readable storage medium storing instructions, the instructions executable by the processor to:
detect a performance degradation of a first component of a computing system, the computing system including a plurality of components;
in response to a detection of the performance degradation of the first component, filter a plurality of system events of the computing system using an impact matrix to generate a filtered set of system events, wherein each system event of the filtered set is associated with a first set of components of the computing system, wherein the impact matrix indicates one or more components of the first set that can have a performance impact on the first component;
perform a linear regression on the filtered set of system events; and
generate a ranked list of system events based on the linear regression, the system events in the ranked list being ordered according to likelihood of having caused the performance degradation.

2. The computing device of claim 1, wherein the computing system comprises a number of components, wherein the impact matrix is a stored data structure organized as a matrix with the number of rows and the number of columns, wherein each matrix cell includes a value indicating whether a particular component can have a performance impact on another component.

3. The computing device of claim 1, wherein the instructions are executable by the processor to:
generate the impact matrix based on a system topology of the computing system, wherein the system topology includes information about the plurality of components of the computing system.

4. The computing device of claim 1, wherein the instructions are executable by the processor to:
calculate an average value of a performance metric associated with the first component over a sample time window;
calculate a variance of the average performance metric over the time window;
calculate an absolute variance difference between the calculated variance and a historical variance; and
detect the performance degradation responsive to a determination that the absolute variance difference exceeds a threshold variance.

5. The computing device of claim 4, wherein the instructions are executable by the processor to:
compare total impact values for one or more subsets of filtered events to the absolute variance difference;

select a first subset of filtered events that matches the absolute variance difference within a given tolerance; and generate the ranked list based on the first subset of filtered events.

6. The computing device of claim 1, wherein the first set of components comprises the first component and the one or more components indicated by the impact matrix.

7. The computing device of claim 1, wherein the instructions are executable by the processor to:

perform one or more automated remedial actions based on the ranked list of system events.

8. A non-transitory machine-readable storage medium storing instructions that upon execution cause a processor to:

detect a performance degradation of a first component of a computing system, the computing system including a plurality of components;

in response to a detection of the performance degradation of the first component, filter a plurality of system events of the computing system using an impact matrix to generate a filtered set of system events, wherein each system event of the filtered set is associated with a first set of components of the computing system, wherein the impact matrix indicates one or more components of the first set that can have a performance impact on the first component;

perform a linear regression on the filtered set of system events; and generate a ranked list of system events based on the linear regression, the system events in the ranked list being ordered according to likelihood of having caused the performance degradation.

9. The non-transitory machine-readable storage medium of claim 8, wherein the computing system comprises a number of components, wherein the impact matrix is a stored data structure organized as a matrix with the number of rows and the number of columns, wherein each matrix cell includes a value indicating whether a particular component can have a performance impact on another component.

10. The non-transitory machine-readable storage medium of claim 8, wherein the instructions upon execution cause the processor to:

generate the impact matrix based on a system topology of the computing system, wherein the system topology includes information about the plurality of components of the computing system.

11. The non-transitory machine-readable storage medium of claim 8, wherein the instructions upon execution cause the processor to:

calculate an average value of a performance metric associated with the first component over a sample time window;

calculate a variance of the average performance metric over the time window;

calculate an absolute variance difference between the calculated variance and a historical variance; and detect the performance degradation responsive to a determination that the absolute variance difference exceeds a threshold variance.

12. The non-transitory machine-readable storage medium of claim 11, wherein the instructions upon execution cause the processor to:

compare total impact values for one or more subsets of filtered events to the absolute variance difference;

select a first subset of filtered events that matches the absolute variance difference within a given tolerance; and generate the ranked list based on the first subset of filtered events.

13. The non-transitory machine-readable storage medium of claim 8, wherein the instructions upon execution cause the processor to:

perform the linear regression using a stored set of weight factors, wherein each weight factor represents a percentage of performance impact that a particular event can have on a particular component.

14. The non-transitory machine-readable storage medium of claim 13, wherein the weight factors are provided by manufacturers of the components of the computing system.

15. A computer implemented method, comprising:

detecting, by a management device, a performance degradation of a first component of a computing system, the computing system comprising a plurality of components;

In response to a detection of the performance degradation of the first component, filtering, by the management device, a plurality of system events of the computing system using an impact matrix to generate a filtered set of system events, wherein each system event of the filtered set is associated with a first set of components of the computing system, wherein the impact matrix indicates one or more components of the first set that can have a performance impact on the first component;

performing, by the management device, a linear regression on the filtered set of system events; and generating, by the management device, a ranked list of system events based on the linear regression, the system events in the ranked list being ordered according to likelihood of having caused the performance degradation.

16. The computer implemented method of claim 15, wherein the computing system comprises a number of components, wherein the impact matrix is a stored data structure organized as a matrix with the number of rows and the number of columns, wherein each matrix cell includes a value indicating whether a particular component can have a performance impact on another component.

17. The computer implemented method of claim 15, comprising:

generating the impact matrix based on a system topology of the computing system, wherein the system topology includes information about the plurality of components of the computing system.

18. The computer implemented method of claim 15, wherein detecting the performance degradation comprises:

calculating an average value of a performance metric associated with the first component over a sample time window;

calculating a variance of the average performance metric over the time window;

calculating an absolute variance difference between the calculated variance and a historical variance; and detecting the performance degradation responsive to a determination that the absolute variance difference exceeds a threshold variance.

19. The computer implemented method of claim 15, comprising:

performing the linear regression using a stored set of weight factors, wherein each weight factor represents a percentage of performance impact that a particular event can have on a particular component.

20. The computer implemented method of claim 15, comprising:

performing, by the management device, one or more automated remedial actions based on the ranked list of system events.

\* \* \* \* \*